United States Patent [19]
Kocher

[11] Patent Number: 6,032,800
[45] Date of Patent: Mar. 7, 2000

[54] LAMINATE AND PACKAGE MADE THEREFROM

[75] Inventor: Patrick N. Kocher, Greer, S.C.

[73] Assignee: Cryovac, Inc., Duncan, S.C.

[21] Appl. No.: 09/078,457

[22] Filed: May 14, 1998

[51] Int. Cl.⁷ .............................. B65D 85/00; B32B 9/00
[52] U.S. Cl. ................................ 206/459.5; 206/524.2; 206/524.3; 206/524.6; 428/411.1; 428/39.7; 426/87; 426/127; 426/129
[58] Field of Search .............................. 426/87, 127, 129, 426/383, 392, 396; 428/43, 172, 304.4, 67, 411.1, 35.7, 35.9; 206/459.5, 524.2, 524.1, 524.3, 524.6; 156/272.6, 252

[56] References Cited

U.S. PATENT DOCUMENTS

| | | | |
|---|---|---|---|
| 1,042,119 | 10/1912 | Kavanagh . | |
| 2,257,823 | 10/1941 | Stokes | 93/3 |
| 2,260,064 | 10/1941 | Stokes | 93/3 |
| 2,623,826 | 12/1952 | Grinstead | 99/174 |
| 2,814,381 | 11/1957 | Stevick | 206/45 |
| 2,815,620 | 12/1957 | Prodigo | 53/14 |
| 2,925,346 | 2/1960 | Harper et al. | 99/174 |
| 3,019,573 | 2/1962 | Navikas | 53/27 |
| 3,074,798 | 1/1963 | Palmer | 99/174 |
| 3,360,382 | 12/1967 | Miller | 99/174 |
| 3,561,668 | 2/1971 | Bergstrom | 229/43 |
| 3,574,642 | 4/1971 | Weinke | 99/174 |
| 3,681,092 | 8/1972 | Titchenal et al. | 99/174 |
| 3,713,849 | 1/1973 | Grindrod et al. | 99/174 |
| 3,716,180 | 2/1973 | Bemiss et al. | 299/13 |
| 3,783,089 | 1/1974 | Hurst et al. | 161/166 |
| 3,808,394 | 4/1974 | Mominee et al. | 219/121 |
| 3,843,806 | 10/1974 | Kishpaugh et al. | 426/106 |
| 4,055,672 | 10/1977 | Hirsch et al. | 426/127 |
| 4,264,392 | 4/1981 | Watt | 156/272 |
| 4,421,823 | 12/1983 | Theisen et al. | 428/349 |
| 4,438,850 | 3/1984 | Kahn | 206/634 |
| 4,522,835 | 6/1985 | Woodruff et al. | 426/264 |
| 4,590,078 | 5/1986 | Umina | 426/113 |
| 4,634,614 | 1/1987 | Holzner | 428/35 |

(List continued on next page.)

FOREIGN PATENT DOCUMENTS

| | | |
|---|---|---|
| 0 698 563 A1 | 8/1965 | European Pat. Off. . |
| 0 261 930 | 9/1987 | European Pat. Off. . |
| 0 270 764 | 10/1987 | European Pat. Off. . |
| 2 323 594 | 9/1975 | France . |
| 2 240 234 | 8/1972 | Germany . |
| 2 251 540 | 1/1991 | United Kingdom . |
| 87/02965 | 11/1985 | WIPO . |
| WO 99/28123 | 6/1999 | WIPO . |

*Primary Examiner*—Keith Hendricks
*Assistant Examiner*—Drew Becker
*Attorney, Agent, or Firm*—Thomas C. Lagaly

[57] ABSTRACT

A laminate includes:

a. a first, substantially gas-impermeable film;

b. a second, delaminatable film; and c. a third, gas-permeable film.

The second film is positioned between the first and third films and the laminate is capable of delaminating within the second film when the laminate is subjected to a delaminating force. A portion of the delaminatable film thus remains bonded to the gas-permeable film after delamination.

21 Claims, 7 Drawing Sheets

U.S. PATENT DOCUMENTS

| | | | |
|---|---|---|---|
| 4,667,814 | 5/1987 | Wakamatsu et al. | 206/0.7 |
| 4,700,531 | 10/1987 | Hsu et al. | 53/412 |
| 4,840,271 | 6/1989 | Garwood | 206/213 |
| 4,842,875 | 6/1989 | Anderson | 426/118 |
| 4,847,148 | 7/1989 | Schirmer | 428/332 |
| 4,886,372 | 12/1989 | Greengrass et al. | 383/100 |
| 4,886,690 | 12/1989 | Davis et al. | 428/36.6 |
| 4,889,731 | 12/1989 | Williams, Jr. | 426/106 |
| 4,910,033 | 3/1990 | Bekele et al. | 426/129 |
| 4,956,212 | 9/1990 | Bekele | 428/36.6 |
| 5,045,331 | 9/1991 | Antoon, Jr. | 426/118 |
| 5,079,059 | 1/1992 | Wyslotsky | 428/43 |
| 5,132,151 | 7/1992 | Graney | 428/40 |
| 5,134,001 | 7/1992 | Osgood | 428/35.2 |
| 5,226,531 | 7/1993 | Garwood | 206/213 |
| 5,296,291 | 3/1994 | Mueller | 428/349 |
| 5,330,777 | 7/1994 | Mize, Jr. et al. | 426/383 |
| 5,348,752 | 9/1994 | Gorlich | 426/129 |
| 5,402,622 | 4/1995 | Stockley, III et al. | 53/427 |
| 5,419,096 | 5/1995 | Gorlich | 53/432 |
| 5,419,097 | 5/1995 | Gorlich et al. | 53/432 |
| 5,439,132 | 8/1995 | Gorlich | 220/359 |
| 5,492,705 | 2/1996 | Porchia et al. | 426/106 |
| 5,518,790 | 5/1996 | Huber et al. | 428/35.2 |
| 5,560,182 | 10/1996 | Garwood | 53/432 |
| 5,686,126 | 11/1997 | Noel et al. | 426/127 |
| 5,759,650 | 6/1998 | Raines et al. | 428/35.7 |
| 5,779,050 | 7/1998 | Kocher et al. | 206/497 |
| 5,916,615 | 6/1999 | Brady et al. | 426/129 |
| 5,919,547 | 7/1999 | Kocher et al. | 428/138 |

LAMINATE AND PACKAGE MADE THEREFROM

BACKGROUND OF THE INVENTION

The present invention relates to an initially gas-impermeable laminate capable of delamination into gas-permeable and gas-impermeable portions. More specifically, the invention pertains to packaging for products, such as food products (e.g., fresh red meat or poultry), that are initially enclosed by the gas-impermeable laminate under certain environmental conditions (e.g., a low-oxygen environment). The initial environmental conditions within the package may subsequently be altered by peelably removing the gas-impermeable portion of the laminate from the gas-permeable portion, thereby allowing air to enter the package to effect a desired change in the packaged product.

Historically, large sub-primal cuts of meat have been butchered and packaged in each supermarket. This arrangement has long been recognized to be inefficient and expensive. It would instead be preferable to butcher and package the meat at a central processing facility which benefits from economies of scale, and then ship the packaged meat to individual supermarkets or other retail outlets such as is done, for example, with many poultry products. It is believed that central processing of meat would also lead to a higher quality, more sanitary product with a longer shelf-life than meat which is butchered and packaged in individual supermarkets.

Fresh red meat presents a particular challenge to the concept of centralized processing and packaging due to its oxygen-sensitivity as manifested primarily in the shelf-life and appearance (color) of a packaged meat product. For example, while a low-oxygen packaging environment generally increases the shelf-life of a packaged meat product (relative to meat products packaged in an environment having a higher oxygen content), red meat has a tendency to assume a purple color when packaged in the absence of oxygen or in an environment having a very low oxygen concentration, i.e., below about 1% oxygen. Unfortunately, such a purple color is undesirable to most consumers, and marketing efforts to teach the consumer about the acceptability of the purple color have been largely ineffective. When meat is exposed to a sufficiently high concentration of oxygen, e.g., as found in air, it assumes a bright red color which most consumers associate with freshness. After 1 to 3 days of such exposure, however, meat assumes a brown color which, like the purple color, is undesirable to most consumers (and indicates that the meat is beginning to spoil).

Thus, in order to effectively butcher and package meat products in a central facility for distribution to retail outlets, the meat would desirably be packaged, shipped, and stored in a low-oxygen environment for extended shelf-life, and then displayed for consumer sale in a relatively high-oxygen environment such that the meat is caused to "bloom" (or, more accurately, "re-bloom") into a red color just before being placed in a retail display case. While in the retail display case, the meat product is desirably contained in a package which protects it from microbial and other contamination. In order to attain the maximum economic benefit from centralized packaging, the package in which the meat product is displayed for consumer sale is the same package in which the meat product is initially packaged and shipped from the central processing facility. As can be appreciated, centralized butchering and packaging of fresh red meat presents a number of difficult packaging challenges.

A variety of packages, known as "case-ready packages," have been developed in an effort to overcome the foregoing challenges. One type of case-ready package is a peelable "vacuum-skin" package ("peelable VSP"). A traditional peelable VSP includes a lid formed from a laminate that separates into gas-permeable and gas-impermeable portions and encloses a packaged meat product that is disposed on a support member. The lid is thermoformable, i.e., capable of being formed into a desired shape upon the application of heat, and is thermoformed about the product on the support member by means of heat and differential pressure. In so doing, the lid is also bonded to the support member outside the periphery of the product. Virtually all of the air is evacuated from the interior of the package so that the lid conforms very closely to the contour of the packaged product. (For further details see, e.g., U.S. Pat. No. Re 30,009 (Purdue et al.) and U.S. Pat No. 5,346,735 (Logan et al.), the disclosures of which are hereby incorporated herein by reference). Another type of peelable VSP is used, e.g., for high-profile meat cuts such as beef roasts, and consists of a pouch in which the meat product is contained. The interior of the pouch is evacuated so that it conforms to the contour of the packaged product. The pouch includes an outer, gas-impermeable portion that is peelably removable from an inner, gas-permeable portion to allow the meat product to re-bloom prior to placing the package in a retail display case. Such a package is exemplified in, e.g., U.S. Ser. No. 08/940,673 entitled PACKAGE COMPRISING AN INNER, GAS-PERMEABLE ENCLOSURE AND AN OUTER, GAS-IMPERMEABLE ENCLOSURE PEELABLY ADHERED TO THE INNER ENCLOSURE and filed Sep. 30, 1997, the disclosure of which is hereby incorporated herein by reference.

Similar to a peelable VSP, a peelable "modified-atmosphere" package ("peelable MAP") includes a lid formed from a laminate. The laminate separates into gas-permeable and gas-impermeable portions and encloses a meat product that is disposed within a support member having a peripheral flange to which the lid is secured. Prior to securing the lid to the support member, air is generally evacuated from the interior of the support member and replaced by a gas that extends the shelf life of the packaged product. The gas-impermeable portion of the lid is peelably removed prior to retail display so that the packaged product is displayed in a state of re-bloom. Examples of such packages are disclosed in, e.g., U.S. Pat. No. 5,686,126; U.S. Ser. No. 08/755,990, filed Nov. 25, 1996 and entitled PACKAGE HAVING A DUAL-FILM LID COMPRISING A GAS-IMPERMEABLE FILM AND A DELAMINATABLE, GAS-PERMEABLE FILM; and U.S. Ser. No. 08/764,405, filed Dec. 11, 1996 and entitled LAMINATE HAVING A COEXTRUDED, MULTILAYER FILM WHICH DELAMINATES AND PACKAGE MADE THEREFROM, the disclosures of which are hereby incorporated herein by reference.

While peelable VSP and MAP case-ready packages have been and continue to be successful, there is always a need and desire for improvements. One area of improvement is product labeling. As with any package, peelable VSP and MAP packages must generally contain some sort of labeling thereon that provides certain information to the consumer such as, e.g., product information, pricing, identification of the company from which the packages originated, etc. In order to be clearly visible to the consumer, such labels are placed on the lid because the transparent laminate from which the lid is formed is always facing the consumer in the retail display case so that both the packaged product and label can be inspected without having to move or handle the package.

For the same reasons that it is desirable to package fresh red meat and poultry products at central processing facilities, it would also be desirable for the packages to be labeled with individualized information at the central processing facilities. Currently, however, such labels must be prepared and affixed to the gas-permeable portion of the lid at the retail facility following the removal of the gas-impermeable portion of the lidding laminate. This is necessary because current lidding laminates for peelable VSP and MAP packages do not generally facilitate centralized printing and/or labeling. In the first place, it is not practical to apply the label to the upper, gas-impermeable portion of the lid because this portion is peeled from the packages and discarded prior to placing the packages in the retail display case. Additionally, placement of the printed image or label within the laminate such that it remains on the package after the gas-impermeable portion is removed has not been feasible. Current commercially successful lidding laminates delaminate within a coextruded, multilayer component-film of the laminate (as opposed to delaminating at a film/film interface) such that only a gas-permeable portion of the coextruded film remains on the package after delamination. It would be impossible to interject a label or printed image between two remaining layers of the coextruded film, and concerns of food contamination would prevent a printed image or label from being applied to the underside of the remaining portion of the coextruded film because such image or label could directly contact the packaged food product. Labels or printed indicia applied to the sidewalls or bottom surface of the support tray are not attractive to consumers who are accustomed to seeing labeling on the upper surface of packages.

Thus, while case-ready packages of the type discussed above have obviated the need for in-store butchering, retail workers are still required to create and apply a unique label for each package, as it is presently not feasible for a pre-printed image to be centrally applied to commercially-available lidding laminates such that the image will remain on the package after the gas-impermeable portion of the lid is removed and the package is placed in a retail display case.

Accordingly, a need exists for a case-ready package with a lidding laminate that can carry product information and other indicia that is applied at a central processing and packaging facility but which remains on the package lid after removal of the gas-impermeable portion so that the information is visible to the consumer.

SUMMARY OF THE INVENTION

That need is met by the present invention, which provides a laminate, comprising:

a. a first, substantially gas-impermeable film;
b. a second, delaminatable film; and
c. a third, gas-permeable film.

The second film is positioned between the first and third films and the laminate is capable of delaminating within the second film when the laminate is subjected to a delaminating force. A portion of the delaminatable film thus remains bonded to the gas-permeable film after delamination.

The laminate is ideally suited as a lidding material for a case-ready package. The third, gas-permeable film is preferably bonded directly to a support member containing therein or thereon a fresh red meat, poultry, or other product, while the first, gas-impermeable film forms the outermost surface of the lid. The gas-impermeable film and a portion of the delaminatable film can be peelably removed from the package to thereby allow atmospheric oxygen to enter the package and cause a packaged meat or poultry product to re-bloom to a customer-preferred red color, after initially being packaged, shipped, and stored in a low oxygen environment as maintained by the first, gas-impermeable film. Both the second and third films are preferably perforated to facilitate the exchange of air for the low-oxygen packaging gas.

Advantageously, an image may be disposed between the second and third films. Such image may be, e.g., a label or printed image bonded to one or both of the second and third films. In this manner, the printed image or label remains trapped between the gas-permeable film and the remaining portion of the delaminatable film after the laminate has been delaminated. Since the image is trapped between two films, it cannot come into direct contact with the packaged food product, either before or after delamination. In addition, the printed image or label can be applied during production of the laminate. Thus, product information and other important indicia can now be applied to the lid of a case-ready package at a central processing/packaging facility, and will remain on the package lid after removal of the gas-impermeable portion so that the information is visible to the consumer.

Definitions

As used herein, the term "laminate" refers to a multiple-film composite structure having two or more films bonded together by any suitable means, including adhesive bonding, reactive surface modification (e.g., corona treatment, flame treatment, or plasma treatment), heat treatment, pressure treatment, heat-welding, etc., including combinations thereof.

As used herein, the term "film" refers to a thermoplastic material, generally in sheet or web form, having one or more layers formed from polymeric or other materials. A film can be a monolayer film (having only one layer) or a multilayer film (having two or more layers).

As used herein, the term "layer" refers to a discrete film component which is coextensive with the film and has a substantially uniform composition. In a monolayer film, the "film" and "layer" would be one and the same.

As used herein, the term "multilayer" refers to a film comprising two or more layers which are bonded together by one or more of the following methods: coextrusion, extrusion coating, vapor deposition coating, solvent coating, emulsion coating, or suspension coating.

As used herein, the terms "extrusion," "extrude," and the like refer to the process of forming continuous shapes by forcing a molten polymeric material through a die, followed by cooling or chemical hardening. Immediately prior to extrusion through the die, the relatively high-viscosity polymeric material is fed into a rotating screw, which forces it through the die.

As used herein, the term "coextrusion," "coextrude," and the like refer to the process of extruding two or more materials through a single die with two or more orifices arranged so that the extrudates merge and weld together into a laminar structure before chilling, i.e., quenching. Coextrusion can be employed in film blowing, free film extrusion, and extrusion coating processes.

As used herein, the phrases "reactive surface modification," "reactively modifying the surface of," "reactively-modified surface" and the like refer to chemically altering the surface of a film in order to incorporate reactive species onto such film surface, e.g., to provide the film surface with auto-adhesion functionality (i.e., rendering the surface capable of adhering to another surface without the need for an adhesive). Specific examples of reactive surface modification include corona treatment, plasma (ionized gas) treatment, and flame treatment, with corona treatment being preferred. The surface of a film which has been subjected to reactive surface modification is referred to as a "reactively-modified surface" or, in the case of corona treatment, a "corona-treated surface."

As used herein, the terms "delaminate," "delaminatable," and the like refer generally to the internal, planar separation of a laminate and, more specifically, to the internal separation of a component film of a laminate within a layer and/or at an inter-layer (i.e., layer/layer) interface within the film, when the laminate of which the film is a component is subjected to a delaminating force of sufficient magnitude. A laminate in accordance with the present invention preferably includes a designated film having an intra-film cohesive strength that is both lower than the inter-film bond-strength (s) between the component films of the laminate and also lower than the intra-film cohesive strengths of the other films in the laminate. In this manner, the designated film internally separates, i.e., delaminates, when the laminate is subjected to a delaminating force that exceeds the intra-film cohesive strength of the film.

As used herein, the term "intra-film cohesive strength" refers to the internal force with which a film remains intact, as measured in a direction that is generally perpendicular to the planar dimension of the film. In a multilayer film, intra-film cohesive strength is provided both by inter-layer adhesion (the adhesive strength between the layers which binds them to one another) and by the intra-layer cohesion of each film layer (i.e., the cohesive strength of each of the film layers). In a monolayer film, intra-film cohesive strength is provided only by the intra-layer cohesion of the layer that constitutes the film.

As used herein, the term "delaminating force" refers to a force applied to a laminate and having opposing components that are perpendicular to the planar dimension of the laminate and being of sufficient magnitude to cause the laminate to delaminate, preferably within a layer and/or at an inter-layer interface, within a designated component film of the laminate.

As used herein, the term "bond-strength" refers to the adhesive force with which two films in a laminate are joined to one another ("inter-film bond-strength") and also the adhesive force with which two layers in a film are joined to one another ("inter-layer bond-strength"), and is measured by the minimum amount of force required to ply-separate the two films or two layers in accordance with ASTM F904-91.

As used herein, the term "intra-layer cohesive strength" refers to the internal, cohesive force with which a layer in a film is held together, and may be measured by the minimum amount of force required to internally separate the layer along the planar dimension thereof.

As used herein, the phrase "gas-permeable" refers to a film or film portion which admits at least about 1,000 cc of gas, such as oxygen, per square meter of film per 24 hour period at 1 atmosphere and at a temperature of 73° F. (at 0% relative humidity). More preferably, a gas-permeable film or film portion admits at least 5,000, even more preferably at least 10,000, such as at least 15,000, 20,000, 25,000, 30,000, 35,000, 40,000, and 50,000, and most preferably at least 100,000 cc of oxygen per square meter per 24 hour period at 1 atmosphere and at a temperature of 73° F. (at 0% relative humidity). In accordance with the present invention, a gas-permeable film or film portion can itself have the aforedescribed levels of gas permeability or, alternatively, can be a film or film portion which does not inherently possess the aforedescribed levels of gas permeability but which is altered, e.g., perforated or peelably delaminated, to render the film gas-permeable as defined above.

As used herein, the phrase "substantially gas-impermeable" refers to a film or film portion which admits less than 1000 cc of gas, such as oxygen, per square meter of film per 24 hour period at 1 atmosphere and at a temperature of 73° F. (at 0% relative humidity). More preferably, a substantially gas-impermeable film admits less than about 500, such as less than 300, and less than 100 cc of gas, more preferably still less than about 50 cc, and most preferably less than 25 cc, such as less than 20, less than 15, less than 10, less than 5, and less than 1 cc of gas per square meter per 24 hour period at 1 atmosphere and at a temperature of 73° F. (at 0% relative humidity).

As used herein, the phrase "product support member" refers to a component of a package on or in which a product is disposed. Meat products are typically disposed in a tray-like package component comprising, e.g., expanded polystyrene sheet material which has been thermoformed into a desired shape, for supporting the meat product. A product support member preferably includes a cavity into which the product is disposed and a peripheral flange which provides a sealing surface for attachment of a lid to the support member to thereby enclose the product within the cavity.

As used herein, the term "heat-weld" (also known as a "heat-seal") refers to the union of two films by bringing the films into contact, or at least close proximity, with one another and then applying sufficient heat and pressure to a predetermined area (or areas) of the films to cause the contacting surfaces of the films in the predetermined area to become molten and intermix with one another, thereby forming an essentially inseparable bond between the two films in the predetermined area when the heat and pressure are removed therefrom and the area is allowed to cool.

DETAILED DESCRIPTION OF THE INVENTION

Figure 1:
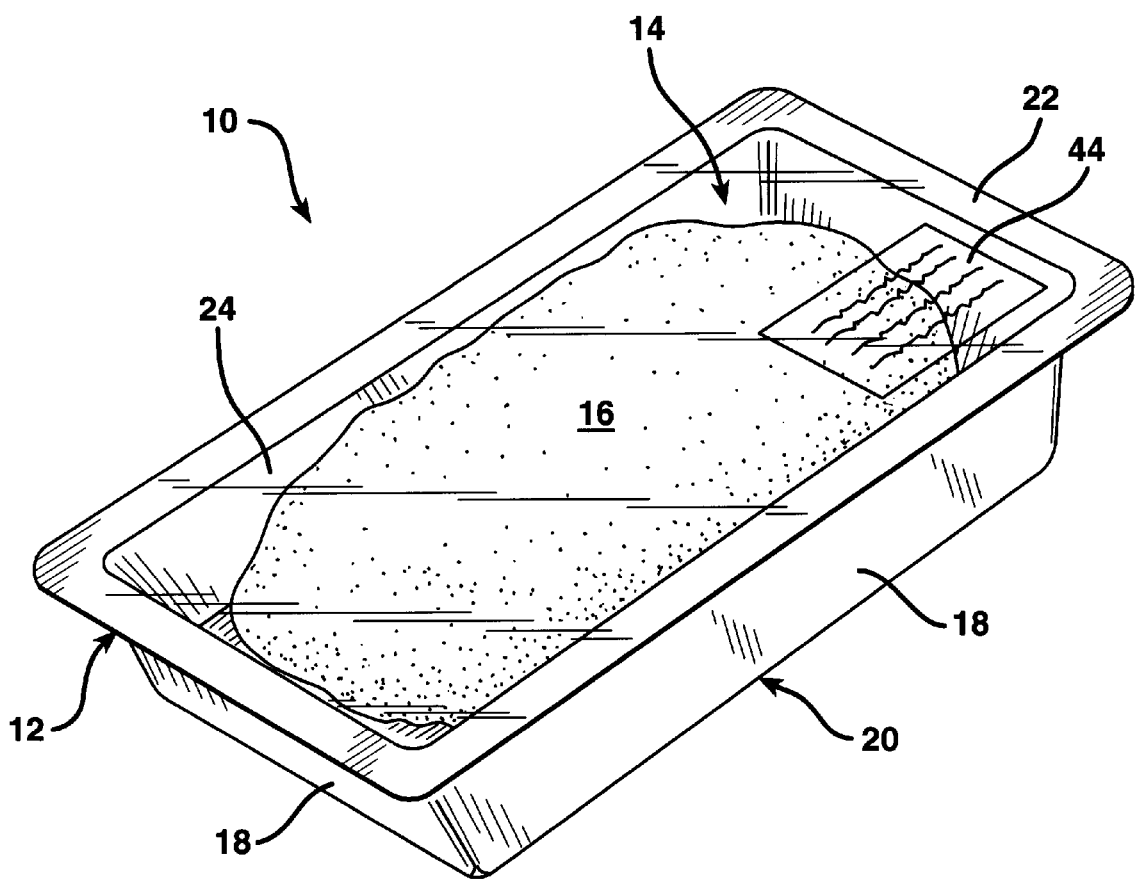
FIG. 1 is a perspective view a package in accordance with the present invention, including a product support member with a product disposed therein and a laminate heat-sealed to the support member as a lid to enclose the product within the support member and laminate.

FIG. 1 illustrates a peelable, modified-atmosphere package 10 in accordance with present invention. While the invention is equally applicable to other types of case-ready packaging as described above (e.g., peelable VSP), for simplicity the invention will be described in connection with a modified-atmosphere package only. Package 10 includes product support member 12 having a cavity 14 formed therein and a product 16 disposed within the cavity. Support member 12 is preferably in the form of a tray having side walls 18 and a base 20 which define the cavity 14, and further includes a peripheral flange 22 extending outwardly from the cavity. A laminate 24 forms a lid on the package and encloses the product 16 within cavity 14 by being heat-welded to flange 22.

Support member 12 can have any desired configuration or shape, e.g., rectangular, round, oval, etc. Similarly, flange 22 may have any desired shape or design, including a simple, substantially flat design which presents a single sealing surface as shown, or a more elaborate design which presents two or more sealing surfaces, such as the flange configurations disclosed in U.S. Pat. Nos. 5,348,752 and 5,439,132, the disclosures of which are hereby incorporated herein by reference. The flange may also include a peripheral lip positioned adjacent and exterior to the sealing surface to facilitate the peelable delamination of lid 24, such as disclosed in U.S. Ser. No. 08/733,843, entitled PACKAGE HAVING PEEL INITIATION MECHANISM and filed Oct. 18, 1996, the disclosure of which is hereby incorporated herein by reference.

Suitable materials from which support member 12 can be formed include, without limitation, polyvinyl chloride, polyethylene terephthalate, polystyrene, polyolefins such as high density polyethylene or polypropylene, paper pulp, nylon, polyurethane, etc. The support member may be foamed or non-foamed as desired, and preferably provides a barrier to the passage of oxygen therethrough, particularly when product 16 is an oxygen-sensitive food product. When such oxygen-sensitive products are to be packaged in a low-oxygen environment (to thereby extend their shelf-life), support member 12 preferably allows less than or equal to about 1000 cc of oxygen to pass, more preferably less than about 500 cc of oxygen, more preferably still less than about 100 cc, even more preferably less than about 50 cc, and most preferably less than about 25 cc of oxygen to pass per square meter of material per 24 hour period at 1 atmosphere and at a temperature of 73° F. (at 0% relative humidity). Support member 12 may comprise a material which itself provides a barrier to the passage of oxygen, e.g., vinylidene chloride copolymer, nylon, polyethylene terephthalate, ethylene/vinyl alcohol copolymer, etc. Alternatively, support member 12 may have a substantially gas-impermeable sealant film laminated or otherwise bonded to the inner or outer surface thereof as described in U.S. Pat. Nos. 4,847,148 and 4,935,089, and in U.S. Ser. No. 08/326,176, filed Oct. 19, 1994 and entitled "Film/Substrate Composite Material" (published as EP 0 707 955 A1 on Apr. 24, 1996), the disclosures of which are hereby incorporated herein by reference. Any such sealant film preferably includes an oxygen-barrier material such as e.g., vinylidene chloride copolymer (saran), nylon, polyethylene terephthalate, ethylene/vinyl alcohol copolymer, etc. Further, when applied to the inner surface of the support member and upper surface of the flange, such sealant film may also be used to improve the heat-weld bond between the lid and support member.

Although product 16 is illustrated as having a maximum height which is below the maximum height of support member 12, i.e., the level at which flange 22 is located, the invention is not limited to such "low profile" products. Rather, "high profile" products may also be packaged in accordance with the present invention, i.e., those having a maximum height which is above the level at which flange 22 is located so that the portion of the product which extends above the level of flange 22 will be in contact with lid 24.

Figure 2:
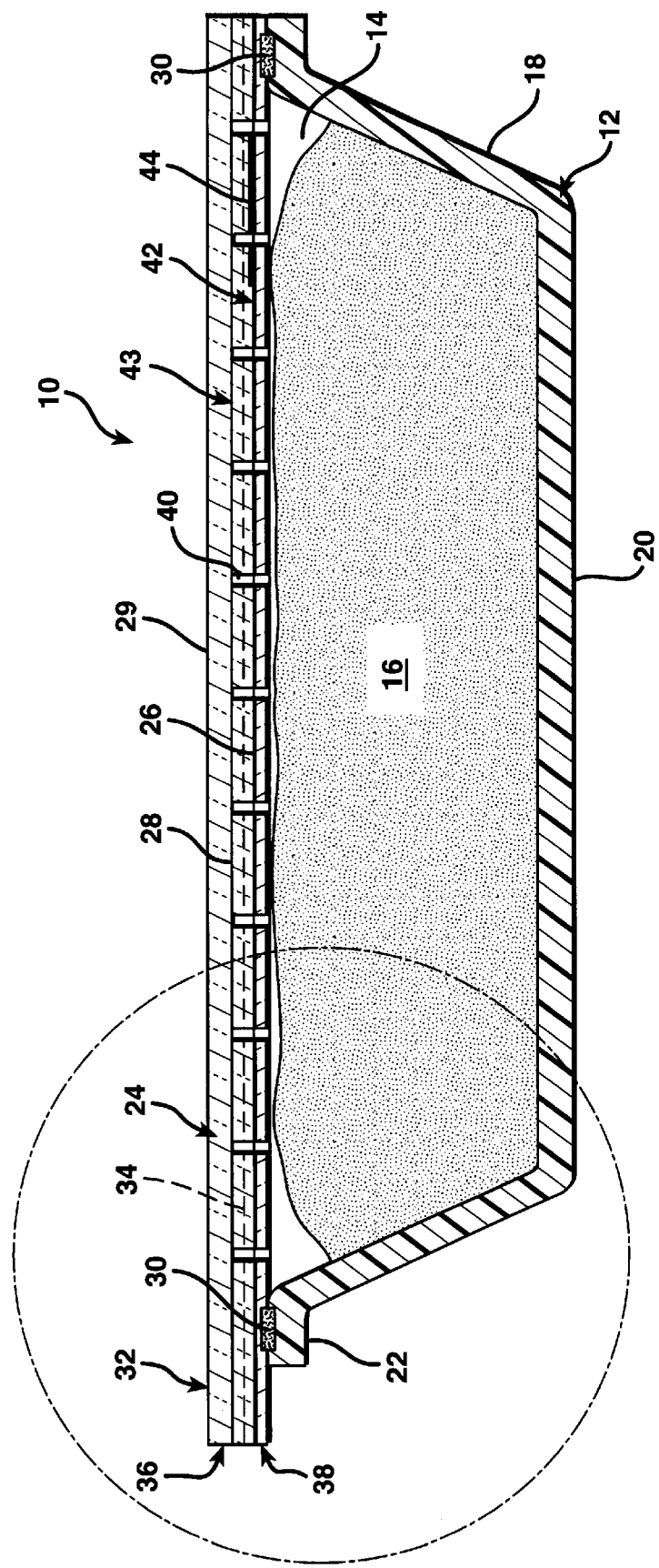
FIG. 2 is a cross-sectional view the package shown in FIG. 1.

FIG. 2 shows package 10 in greater detail. Laminate/lid 24 in accordance with the present invention comprises a first, substantially gas-impermeable film 29; a second, delaminatable film 28; and a third, gas-permeable film 26. Preferably, first and second films 29 and 28 are bonded directly to one another and second and third films 28 and 26 are bonded directly to one another. If desired, additional films may be included between the first, second and third films. Gas-permeable film 26 is preferably bonded directly to flange 22 of support member 12 via heat-weld 30. Heat-weld (or heat-seal) 30 preferably extends continuously around the upper surface of flange 22 to thereby hermetically seal product 16 within package 10. In this manner, laminate 24 and support member 12 preferably form a substantially gas-impermeable enclosure for product 16 which substantially completely protects the product from contact with the surrounding environment including, in particular, atmospheric oxygen, but also including dirt, dust, moisture, microbial contaminates, etc., especially when product 16 is a food product. When product 16 is oxygen-sensitive, i.e., perishable, degradable, or otherwise changeable in the presence of oxygen, such as fresh red meat products (e.g., beef, veal, lamb, pork, etc.), poultry, fish, cheese, etc., it is preferred that product 16 be packaged in a low-oxygen environment within package 10 to maximize the shelf-life of the product.

When packaged as shown in FIG. 2, product 16 can be maintained under any desired environmental conditions by virtue of the substantial gas-impermeability of laminate 24 (and support member 12) while gas-impermeable film 29 remains bonded to the remainder of laminate 24. For example, when product 16 is a fresh red meat product, a low oxygen environment (e.g., less than 0.5% oxygen by volume) is preferably maintained within cavity 14 to preserve the meat product during shipping and storage. However, under such conditions, a fresh red meat product will have a purple color that is undesirable to consumers. For this reason, lid 24 is delaminatable such that, after delamination, atmospheric oxygen can enter the package, thereby causing the fresh red meat product to re-bloom to a more desirable color of red.

More specifically, laminate 24 delaminates within the second film 28 when the laminate is subjected to a delaminating force. In this manner, one portion of second film 28 remains bonded to the first, gas-impermeable film 29 and is removed from the package 10 while the other portion of second film 28 remains bonded to the third, gas-permeable film 26 on support member 12. Delamination within a component film of a multi-film laminate has been found to provide superior performance to delamination at a film/film lamination interface. Specifically, delamination at a layer/layer interface of a coextruded, multilayer film has been found to be much more consistent and predictable, in terms of the amount of delamination force required to cause delamination, than delamination at a film/film lamination interface. In addition, it is often desirable that the remaining gas-permeable permeable portion of the laminate contain very small perforations (e.g., less than about 250 microns in diameter) in order to increase the rate at which the packaged meat product blooms after removal of the gas-impermeable portion of the laminate. Conventional mechanisms for bonding the permeable and impermeable films often interfere with the ability of such perforations to allow atmospheric oxygen to pass therethrough after the impermeable portion has been removed. For example, the use of heat and pressure to bond the two films can weld closed the ends of the perforations while an adhesive can block the ends of the perforations. These problems are avoided with a laminate in accordance with the present invention by providing for delamination within a perforated component film of the laminate, i.e., through the perforations in a direction that is perpendicular to the axial dimension of the perforations. Thus, even the ends of the perforations have been welded closed or blocked, by delaminating within the perforation, the closed or blocked portion is removed to expose the remaining, non-blocked portion to the atmosphere In accordance with the present invention, delamination can be performed simply and easily by a retail worker just prior to placing the package in a display case for customer purchase as follows. The worker preferably grasps extended portion 32 of laminate 24 and applies a delaminating force thereto by pulling generally upwards and backwards (i.e., towards an opposite edge or corner of the package), thereby causing delaminatable film 28 to delaminate along a predetermined plane 34 therewithin (as represented by the dashed line in film 28). The portion 36 of laminate 24 above plane 34 is substantially gas-impermeable, e.g., because it includes gas-impermeable film 29. On the other hand, the portion 38 of laminate 24 below the delamination plane 34 is preferably permeable to gas and, in particular, oxygen. The gas-impermeable portion 36 of laminate 24 is thus removed from the package while the gas-permeable portion 38 remains bonded to the support member 12. Atmospheric oxygen can thereby enter the package to cause product 16 to re-bloom, preferably within about 30–45 minutes.

Figure 3:
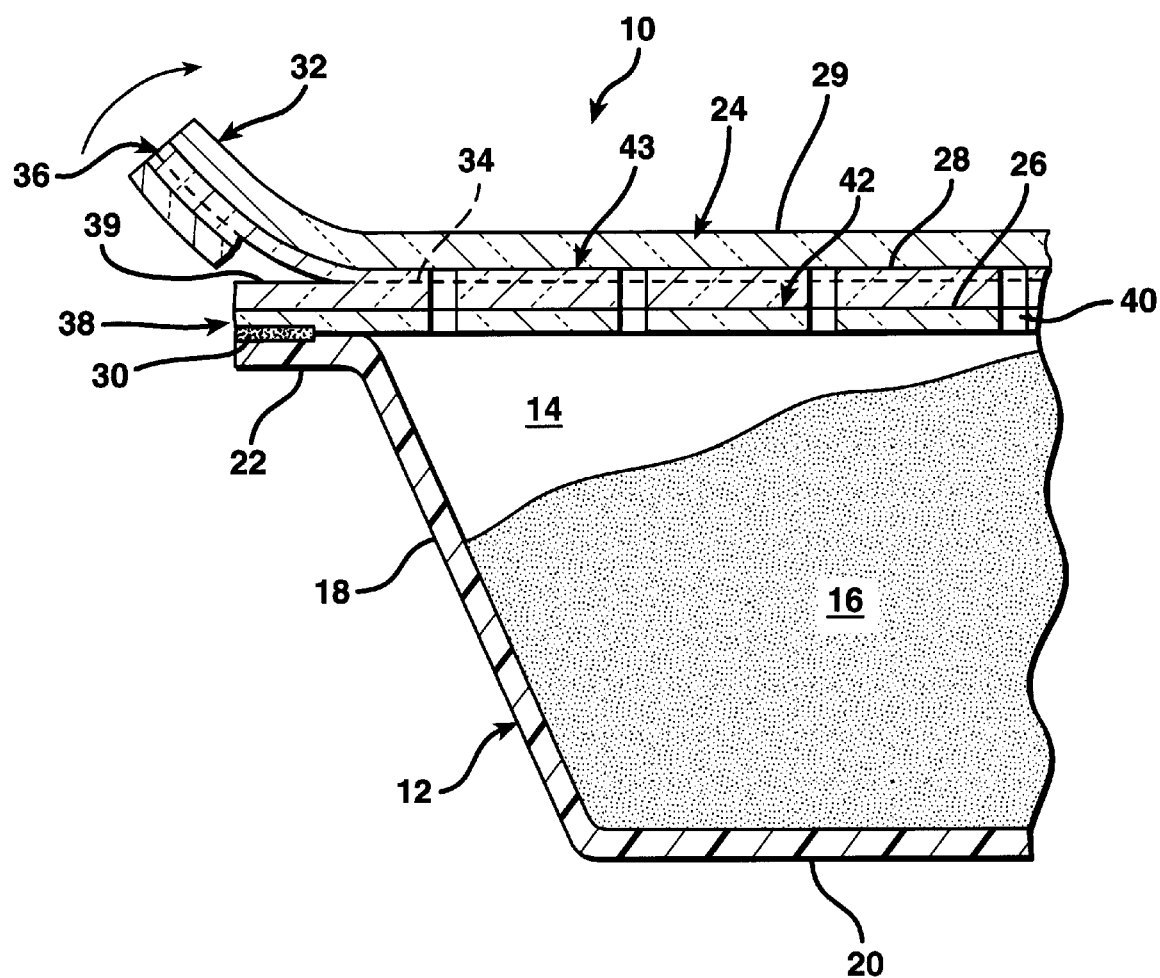
FIG. 3 is an enlarged cross-sectional view of a portion of the package illustrated in FIG. 2, wherein peelable delamination of the laminate has been initiated.

Delamination of laminate 24 is shown in FIG. 3 in greater detail, wherein the laminate 24 is shown as it begins to delaminate within delaminatable film 28 along plane 34 thereof, as viewed from the portion of package 10 shown in the circle in FIG. 2. Gas-permeable film 26 is preferably bonded to delaminatable film 28 at interface 42 at a bond-strength that is greater than the intra-film cohesive strength within delaminatable film 28. Similarly, gas-impermeable film 29 is preferably bonded to delaminatable film 28 at interface 43 at a bond-strength that exceeds the intra-film cohesive strength within film 28. Additionally, heat-weld 30 preferably results in a bond between gas-permeable film 26 and support member 12 that is also greater than the intra-film cohesive strength within delaminatable film 28. In this manner, when laminate 24 is subjected to a delaminating force as indicated by the arrow in FIG. 3, the lid delaminates within the second film 28 such that the gas-permeable portion 38 remains bonded to support member 12 while the gas-impermeable portion 36 is removed from the package and discarded. Thus, gas-permeable film 26 remains bonded to support member 12 via heat-weld 30 and remaining portion 39 of delaminatable film 28 remains bonded to gas-permeable film 26 via the bond between films 26 and 28 at interface 42.

A preferred means for applying a delaminating force to laminate 24 is by manually peeling the gas-impermeable portion 36 from the gas-permeable portion 38. This may conveniently be effected by a retail worker just prior to placing the package in a retail display case. To facilitate peeling, laminate 24 preferably includes an extented portion 32. This extended portion serves as a grippable tab that can be manually grasped to initiate peeling, and is preferably formed as disclosed in U.S. Ser. No. 08/814,671 entitled LIDDED PACKAGE HAVING A TAB TO FACILITATE PEELING (filed Mar. 11, 1997), the disclosure of which is hereby incorporated herein by reference. Peeling is initiated by grasping and pulling extended portion 32 in the direction of the arrow shown in FIG. 3. Heat-weld 30 directs this delaminating force upwards, tearing substantially vertically through gas-permeable film 26 and portion 39 of film 28. The delaminating force then propagates along plane 34. The heat-weld 30 and inter-film bond at interface 42 hold the gas-permeable portion 38 intact and secured to support member 12, and thereby supply a generally downwardly directed component of the delaminating force as the retail worker applies a generally upwardly directed component of the delaminating force during the peeling process. The laminate is preferably constructed such that delamination plane 34 within film 28 represents the weakest adhesive or cohesive bond in laminate 24. In this fashion, the upward and downward components of the delaminating force diverge at plane 34 so that the laminate delaminates at that location.

Figure 4:
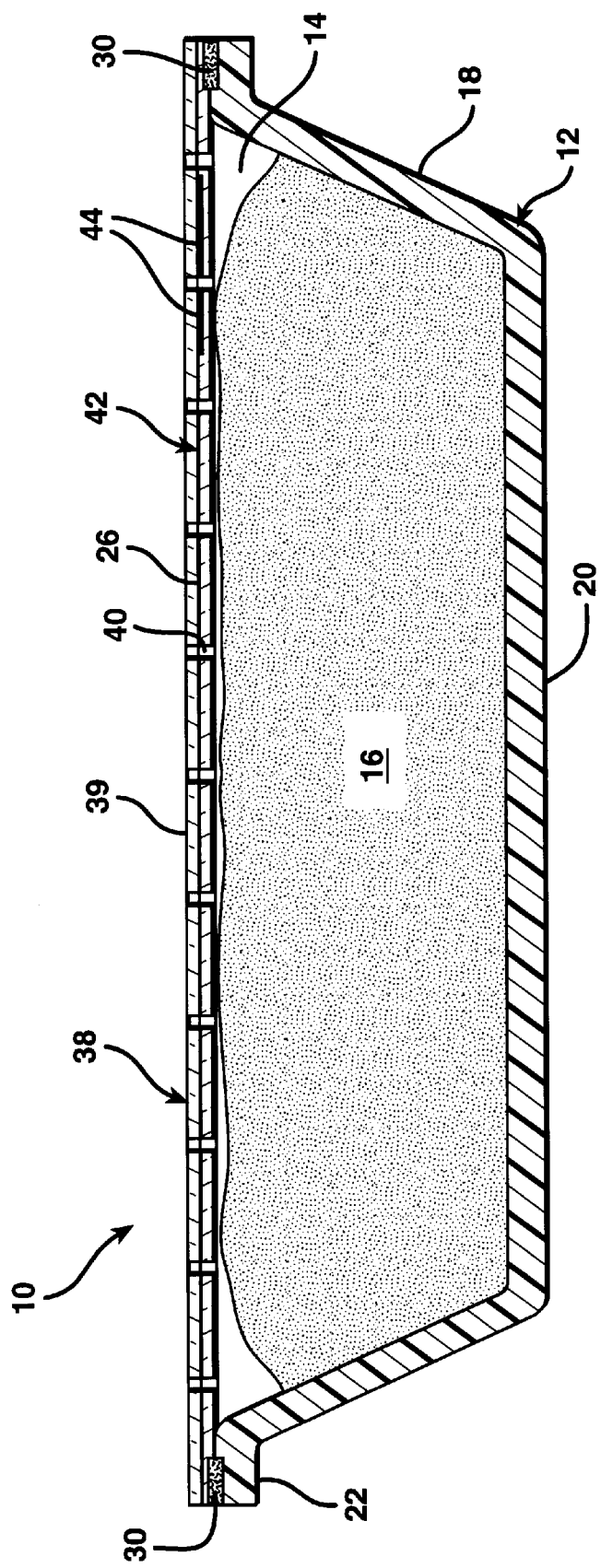
FIG. 4 is a cross-sectional view the package of FIGS. 2 and 3 wherein the laminate has been peelably delaminated such that only a gas-permeable portion thereof remains lidded to the product support member.

The end result of the delamination process is shown in FIG. 4, wherein gas-impermeable portion 36 of laminate 24 has been removed from package 10 such that only gas-permeable portion 38 of the laminate, including gas-permeable film 26 and remaining portion 39 of delaminatable film 28, remains bonded to support member 12 as a gas-permeable lid. In this manner, product 16 remains fully enclosed within package 10, i.e., the gas-permeable portion 38 of laminate 24 is still heat-welded to flange 22 of support member 12 via first heat-weld 30 and continues to protect the product from microbes and other contaminates. However, air can now enter the cavity 14 of package 10 through the now-exposed gas-permeable portion 38. If product 16 is a fresh red meat or poultry product originally packaged in a gas having a low oxygen content, air entering the package will quickly displace the low-oxygen gas and the oxygen in the entering air will cause the product to re-bloom, thereby making package 10 ready for consumer display.

In order to achieve complete re-bloom within a 30–45 minute time-frame, gas-permeable film 26 and remaining portion 39 of delaminatable film 28 preferably contain perforations 40 therein to facilitate the ingress of atmospheric oxygen into the enclosed cavity 14 of package 10 following the delamination of laminate 24. The perforations in film 26 and film portion 39 are preferably vertically aligned as shown in order to provide unimpeded gaseous passageways into and out of cavity 14. As will be discussed in further detail below, this is most conveniently achieved by first laminating films 26 and 28 together and then forming perforations 40 completely through the thickness of the resulting laminate in a single operation. In this manner, film 28 includes perforations 40 extending through the entire thickness thereof such that the plane of delamination 34 passes through the perforations. Thus, when laminate 24 is caused to be delaminated, that portion of each of perforations 40 extending above plane 34 in film 28 is removed from the package along with gas-impermeable portion 36 of laminate 24. As shown in FIG. 4, the remaining portion of each of the perforations 40 in gas-permeable laminate portion 38 is thereby exposed to direct contact with the surrounding atmosphere to allow gaseous communication between the atmosphere and cavity 14 of package 10.

As an alternative to including perforations to promote rapid gas exchange into and out of the package 10, gas-permeable film 26 and/or the remaining portion 39 of delaminatable film 28 may be very thin and/or comprise highly gas-permeable materials.

Regardless of whether second film 28 is perforated, it is preferred that it is formed from a gas-permeable material.

More specifically, it is preferred that at least remaining portion 39 of film 28 is formed from a gas-permeable material. This allows re-bloom to occur on any part of product 16 that is in direct contact with the inner surface of laminate 24 after delamination thereof.

An advantage of the present invention is that an image 44, e.g., a printed image or pre-printed label, may be disposed at the interface 42 between films 26 and 28 prior to laminating the two films together. This may be accomplished by printing one or more images on one or both of films 26 or 28 in such a manner that the images are "trapped" between the two films at interface 42 upon laminating the films together. Alternatively, one or more pre-printed labels may be inserted and optionally adhered to one or both of the films prior to laminating them together to thereby trap the label between the films. Since the image 44 is disposed at interface 42 below delamination plane 34, it remains with gas-permeable portion 38 of laminate 24 after delamination of the laminate. In this manner, package 10 may be provided with consumer-specific information in the form of a pre-printed image and/or label at the same centralized packaging facility in which the package is made, thereby making it unnecessary for such printing or labeling to be carried out at retail. Because the image 44 is applied to the laminate prior to assembling the package, however, it may be necessary to provide information pertaining to pricing and/or weight after the package has been assembled. Nevertheless, indicia such as product information, nutritional information, source identification, etc. can be applied to the laminate in accordance with the present invention prior to assembly of the package.

A preferred method for making package 10 is disclosed generally in the above-referenced and incorporated U.S. Ser. No. 08/814,671 entitled LIDDED PACKAGE HAVING A TAB TO FACILITATE PEELING. Such a method begins with providing a product support member 12 and placing in the cavity 14 thereof a product 16, preferably a fresh red meat product such as, beef, veal, lamb, pork, venison, etc. Laminate 24 is then placed over the product-containing support member and heat-sealed to the flange 22 thereof, thereby enclosing the product within the cavity. Laminate 24 is preferably supplied from a larger web of the laminate, e.g., from a roll which is unwound to supply material as needed, by placing the web (not shown) over support member 12 and severing laminate 24 from the web after or simultaneously with the heat-welding of the laminate to the support member. Laminate 24 can be severed from the web in this manner with any conventional cutting device, e.g., a sharp cutting instrument or a thermal cutting device such as a heated wire or heated blade.

The packaging method preferably includes, prior to enclosing the product within the support member, the step of at least partially evacuating the cavity of air and then at least partially filling the cavity with a gas which is lower in oxygen content than air. Any desired amount of air may be removed from the enclosure during the evacuation step, e.g., ranging from 1% to 99.999% by volume. In the case where a fresh red meat product is to be packaged, the amount of air removed preferably ranges from about 99% to about 99.999%, and more preferably from about 99.5% to about 99.999% by volume. Preferred gases to replace the evacuated air include, e.g., carbon dioxide, nitrogen, argon, etc., and mixtures of such gases. As a result of these steps, the cavity 14 of package 10 will preferably contain, prior to delamination of laminate 24, less than 1% oxygen by volume, more preferably less than 0.5% oxygen, even more preferably less than 0.1% oxygen, and most preferably, less than 0.05% oxygen by volume, with the balance comprising a different gas or mixture of different gases, such as a mixture of carbon dioxide and nitrogen. When package 10 provides a substantially gas-impermeable enclosure as is preferred, such a modified-atmosphere packaging environment ensures that a packaged fresh red meat product will have a shelf-life of at least seven days, more preferably at least ten days, even more preferably at least fourteen days and, most preferably, at least twenty one days (assuming, of course, that the package is maintained under refrigerated conditions, e.g., at temperatures ranging from about 28° F. to about 48° F. and preferably substantially in the absence of light).

As mentioned above, when a fresh red meat product is maintained in a low-oxygen environment, it has a purple color that is aesthetically unappealing to most consumers. Thus, the final preferred step (or one of the final steps) in a packaging method according the present invention is to peelably remove the gas-impermeable portion 36 from the laminate just prior to placing the package in a retail display case. In this fashion, air enters cavity 14 through the remaining, gas-permeable portion 38 to displace at least some of the gas which is lower in oxygen content than air. In this manner, atmospheric oxygen is permitted to come into contact with the packaged fresh red meat product and cause it to bloom to a bright red color which consumers associate with freshness.

Figure 5:
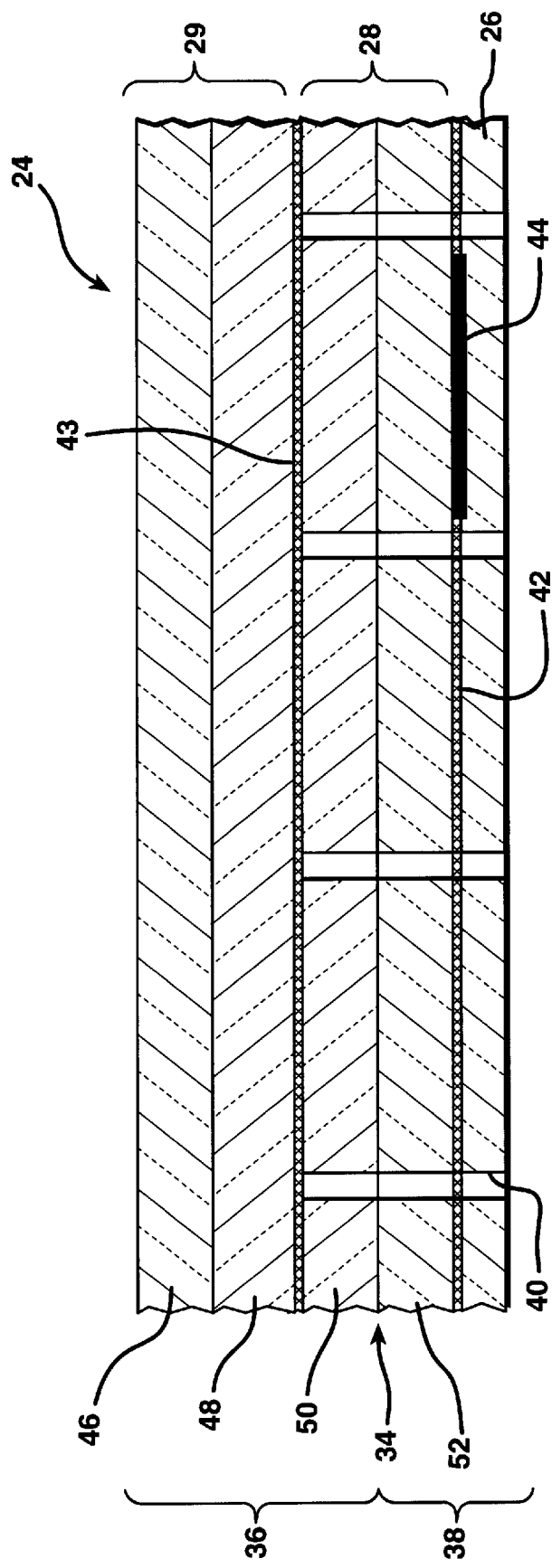
FIG. 5 is an enlarged cross-sectional view of the laminate that forms the lid for the package illustrated in FIGS. 1–3.

FIG. 5 illustrates a representative structure for laminate 24. Gas-impermeable film 29 is preferably a coextruded, multilayer film having at least two layers, including an oxygen-barrier layer 46 and a bonding layer 48. Delaminatable film 28 is preferably a coextruded, multilayer film having at least two layers, including layers 50 and 52. Gas-permeable film 26 may be a monolayer film as shown or a multilayer film if additional layers are desired or necessary. Films 28 and 29 are preferably bonded together at interface 43 via layers 48 and 50 while films 26 and 28 are preferably bonded together at interface 42.

Films 26, 28 and 29 may be formed by any conventional film-forming technique, such as by cast or hot-blown processes, and may be oriented or non-oriented as desired. Each of films 26, 28 and 29 may have any desired thickness, ranging, e.g., from about 0.1 mil to about 12 mils. Preferably, the films range in thickness from about 0.2 mils to about 8 mils, more preferably from about 0.3 mils to about 5 mils and, most preferably, from about 0.3 mil to about 3 mils. It is generally preferred that each of films 26, 28, and 29 are coextruded, multilayer films. The laminate and film structures shown in FIG. 5 are intended to be illustrative only and not in any way limiting in scope of the present invention. A greater or lesser number of films or film layers may be included as desired or necessary.

Oxygen-barrier layer 46 preferably includes a material which provides a substantial barrier to the passage of gas, particularly oxygen, therethrough so that film 29 is substantially gas-impermeable. Suitable materials include, e.g., vinylidene chloride copolymer (saran), nylon, polyethylene terephthalate, ethylene/vinyl alcohol copolymer, silicon oxides (SiOx), etc. Other materials may be employed as necessary or desired. Bonding layer 48 is preferably formed from a material capable of forming a strong laminate bond with layer 50 at interface 43. However, if a material is used for layer 46 that both provides a sufficient barrier to the passage of oxygen and can form a strong bond with layer 50, layer 48 may be omitted.

Figure 6:
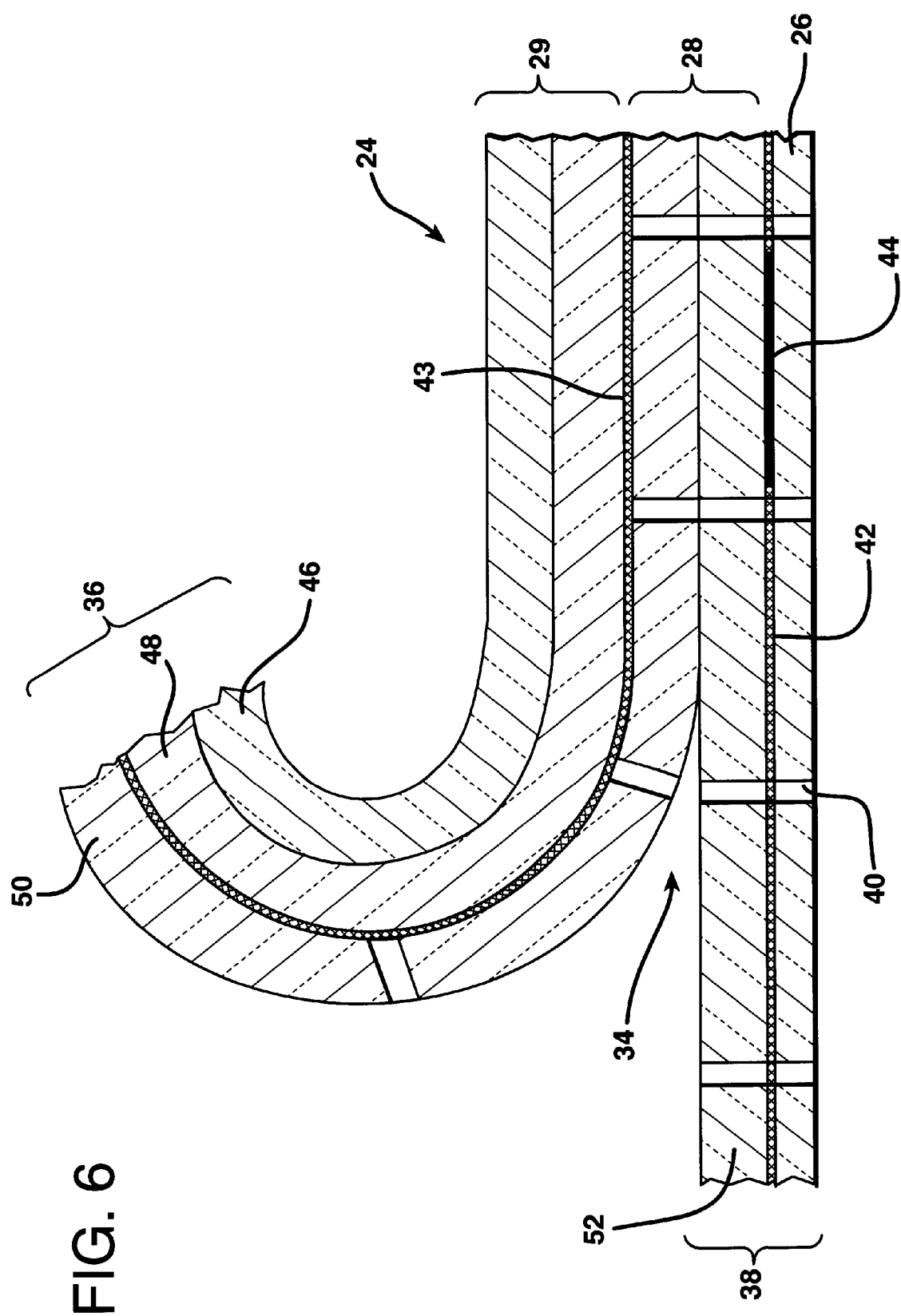
FIG. 6 illustrates the laminate of FIG. 5 as it delaminates into gas-permeable and gas-impermeable portions.

Film 28 is preferably capable of delaminating along plane 34 so that laminate 24 separates into gas-impermeable portion 36, which includes gas-impermeable film 29 with layer 50 bonded thereto, and gas-permeable portion 38 including gas-permeable film 26 with layer 52 bonded thereto (see FIG. 6). It is thus preferred that the intra-film cohesive strength between layers 50 and 52 of film 28 is less than the bond-strength between films 26 and 28 at interface 42 and also less than the bond-strength between films 28 and 29 at interface 43. This can be accomplished by constructing laminate 24 such that the inter-layer bond-strength between layers 50 and 52 is the weakest bond within the laminate. In this manner, laminate 24 delaminates within delaminatable film 28 when the laminate is subjected to a delaminating force as shown in FIG. 6.

Accordingly, relatively strong inter-film, i.e., lamination, bonds are desired at interfaces 42 and 43 while a relatively weak inter-layer bond is desired at plane 34 between layers 50 and 52.

A relatively weak inter-layer bond between layers 50 and 52 can be achieved when one of layers 50 or 52 comprises a non-polar material while the other adjacent layer comprises a polar material. For example, one of adjacent layers 50 or 52 may comprise non-polar polyethylene homopolymer or copolymer or polymethylpentene while the other adjacent layer may comprise at least one material selected from the group consisting of polyamide, copolyamide, polyester, copolyester (e.g., polyethylene terephthalate), polar polyethylene copolymers (e.g., ethylene/vinyl alcohol), polycarbonate, polyvinylidene chloride copolymer, polyurethane, polybutylene homopolymer and copolymer, and polysulfone. Alternatively, one of layers 50 or 52 may comprise polyethylene homopolymer or copolymer while the other adjacent layer comprises polypropylene homopolymer or copolymer.

As an alternative to inter-layer adhesive separation as a means of achieving delamination within film 28 as shown, the delaminatable film may include a layer that internally (cohesively) separates along the planar dimension of the film when the laminate is exposed to a delaminating force.

A combination of inter-layer adhesive failure and intra-layer cohesive failure within delaminatable film 28 may also be employed, if desired, as a means of achieving delamination within such film. This can occur, e.g., when the primary plane of delamination is between two adjacent film layers as shown but the delamination path "wanders" into one or both of the adjacent film layers.

Regardless of the particular mechanism by which delaminatable film 28 is caused to delaminate when laminate 24 is subjected to a delaminating force, it is preferred that the intra-film cohesive strength within delaminatable film 28 ranges from about 0.001 to about 2.5 pounds per inch. A more preferred intra-film cohesive strength ranges from 0.005 and 2 pounds/inch and, more preferably, between 0.01 and 1.5 pounds/inch. This may be accomplished by constructing delaminatable film 28 such that the inter-layer bond-strength between layers 50 and 52 ranges from about 0.001 to about 2.5 pounds per inch. In this manner, when laminate 24 is subjected to a delaminating force ranging from 0.001 to 2.5 pounds per inch, the laminate delaminates along plane 34 between layers 50 and 52. Alternatively, film 28 may comprise at least one layer that cohesively separates as described above, such that the cohesively separating layer has an intra-layer cohesive-strength ranging from about 0.001 to about 2.5 pounds per inch.

An intra-film cohesive strength ranging from 0.001 to 2.5 pounds per inch provides a balance between sufficient adhesion to prevent premature separation during manufacture, shipping and storage, and sufficient peelability so that delaminatable film 28 can be delaminated without tearing or otherwise compromising the integrity of the remaining gas-permeable portion 38 of laminate 24.

If necessary or desired, the inter-layer adhesion between adjacent layers 50 and 52 may be increased or decreased by the inclusion of additives into one or both layers which serve to promote or defeat adhesion between such layers. Examples of adhesion-promoting additives (i.e., to increase adhesion between layers 50 and 52) include, e.g., anhydride-modified or acid-modified polyolefins and other polymers that have a relatively high affinity for the polymer(s) from which the other layer is formed. Examples of adhesion-defeating additives include, e.g., teflon, anti-block agents (e.g., silica, clay, or glass beads), anti-fog agents, etc.

In conjunction with constructing film 28 such that it has relatively low intra-film cohesive strength, preferential delamination within that film is also achieved by forming relatively strong inter-film, i.e., lamination, bonds at interfaces 42 and 43. Accordingly, layers 48 and 50, which are in contact with and bonded to one another at interface 43 of films 28 and 29, and layer 52 and film 26, which are bonded to one another at interface 42 of films 28 and 26, preferably comprise materials that can be bonded together by a suitable lamination technique such that films 26, 28, and 29 are bonded together at respective bond-strengths that are greater than the intra-film cohesive strength within delaminatable film 28. Suitable lamination techniques include, e.g., adhesive bonding, reactive surface modification (e.g., corona treatment, flame treatment, or plasma treatment), heat treatment, pressure treatment, heat-welding, etc., including combinations thereof.

Figure 7:
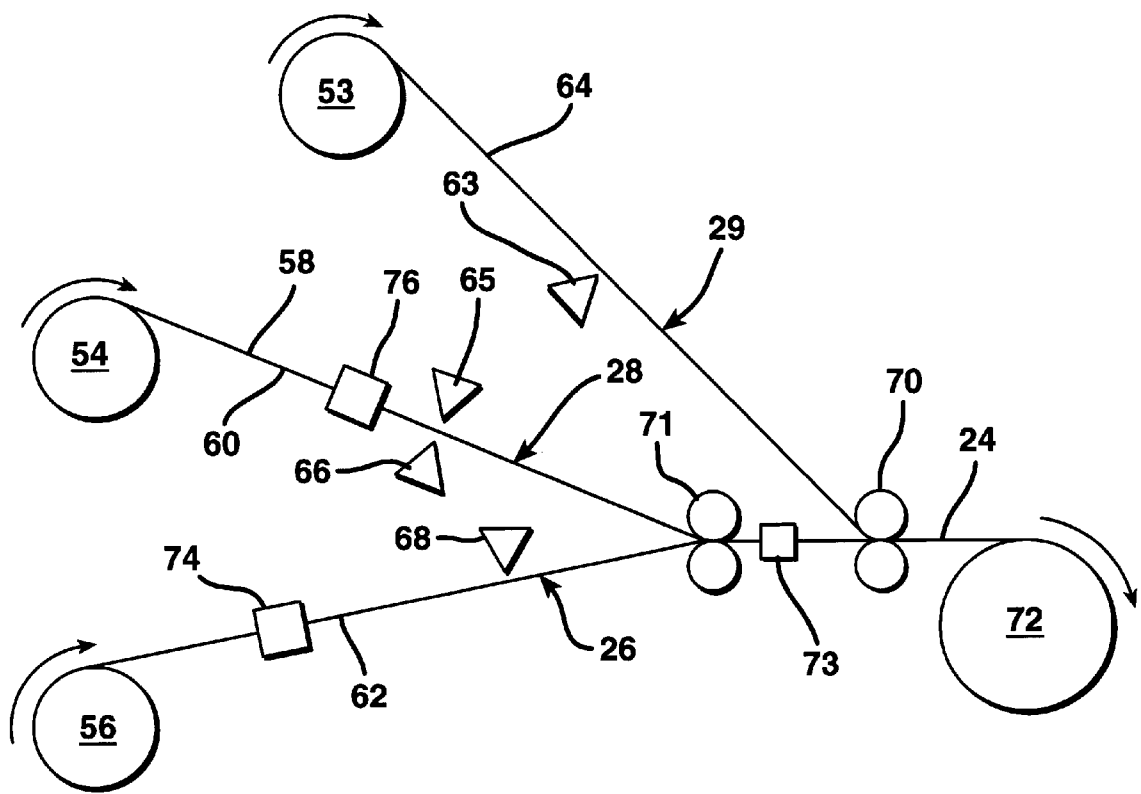
FIG. 7 is a schematic illustration of a process for making the laminate shown in FIG. 5.

A preferred lamination technique is reactive surface modification and, more preferably, corona treatment combined with pressure and, optionally, heat immediately after corona treatment. A preferred process is illustrated in FIG. 7, wherein gas-impermeable film 29 is unwound from storage roll 53, delaminatable film 28 is unwound from storage roll 54, and gas-permeable film 26 is unwound from storage roll 56. Preferably, bonding surfaces 62 and 64 of respective films 26 and 29, as well as both surfaces 58 and 60 of film 28, are reactively modified by corona treatment units 63, 65, 66, and 68. In this manner, all film surfaces that are to be bonded to another film surface are provided with a reactively modified surface to thereby enhance bonding. The actual bonding of films 26, 28, and 29 is then completed by passing the films through nip rolls 70, which apply sufficient pressure to the films to create a bond at interfaces 42 and 43. Preferably, the nip rolls 70 also apply heat to films 26, 28, and 29 to further enhance bonding thereof. Alternatively, films 26 and/or 28 can be pre-heated prior to being conveyed through nip rolls 70. The completed laminate 24 is then taken up on a storage roll 72 to be subsequently used for providing lids to packages as discussed above.

The amount of corona discharge to which the films are exposed is directly proportional to the amount of power supplied to the corona treatment units, and also to the speed at which the films are passed through the units. In general, corona treatment units operate by passing a high voltage electrical current through an electrode positioned adjacent a film surface to be treated. The electrode then produces an electrical discharge which ionizes the surrounding air to cause reactive surface modification, e.g., oxidation, of the treated film surface. Any desired combination of power input to the corona unit and film speed may be employed to achieve a desired bond-strength between the films. As noted above, such bond-strength is preferably greater than the intra-film cohesive strength within delaminatable film 28. In this manner, the laminate 24 will not delaminate at interface 42 or 43 but will, instead, delaminate within the delaminatable film 28.

The amount of power to supplied to the corona treatment units may range, e.g., from about 0.02 to about 0.5 kilowatts (kw) per inch of film width and the film speed through the corona treatments unit may range, e.g., from about 10 to about 2000 feet/minute. Corona treatment units are commercially available, e.g., from Enercon Industries Corporation of Menomonee Falls, Wis.

Alternatively or in addition to reactive surface modification, heat-welding may be employed to bond films 26, 28, and 29 together at interfaces 42 and 43. The film layers located at interface 42 and/or 43 may be formed from suitable materials that are capable of forming a heat-weld with a corresponding layer across the interface such that film 26 is welded to film 28 across interface 42 and/or film 28 is welded to film 29 across interface 43 when the laminate 24 is heat-welded to support member 12. Thus, with reference to FIG. 5, layers 48 and 50 may be formed from or include materials that are capable of forming a heat-weld with one another across interface 43 at the heat-welding temperature used to weld the laminate to the support member. Similarly, layer 52 of film 28 and film 26 may also be formed from or include materials that are capable of forming a heat-weld across interface 42. Three heat-welds can thus be formed simultaneously at the time the package is lidded with laminate 24 as described above.

Heat-welds bonding films 26, 28 and 29 at interfaces 42 and/or 43 are advantageous in that the welds serve to channel an applied delaminating force between the interfaces 42 and 43 and into the desired plane of delamination 34. However, because it is intended that layers 50 and 52 will peelably separate when a delaminating force is applied to laminate 24, it is preferred that layers 50 and 52 comprise materials that will not form a heat-weld, or at least not a strong heat-weld, when the laminate is sealed to the support member.

Examples of compatible materials for inclusion in bonding layers 48/50 and in layer 52/film 26 include polyethylene homopolymers such as, e.g., low density polyethylene or high density polyethylene, and polyethylene copolymers such as, e.g., homogeneous (single-site catalyzed) and heterogeneous (Zeigler-Natta catalyzed) ethylene/alpha-olefin copolymers. The same polyethylene or a different polyethylene may be included in the adjacent film layers, provided that the polyethylenes chosen for inclusion in such adjacent layers are capable of forming heat-welds with one another across interfaces 42 and 43. Other compatible materials, e.g., polypropylenes or other polyolefins, such as ethylene, vinyl acetate, ethylene/butyl acrylate, ionomers, etc., may also be employed as desired.

Non-adhesive lamination techniques, such as reactive surface modification and heat-welding as discussed immediately above, are preferred, primarily for reasons of economy. However, adhesive lamination can generally be successfully employed to form a strong bond when non-adhesive lamination is unable to provide a sufficiently strong bond at one or both of interfaces 42 or 43.

In a preferred embodiment of the present invention, gas-permeable film 26 and delaminatable film 28 are perforated as shown in FIGS. 5 and 6. Perforations 40 are preferably formed in films 26 and 28 in the same operation after those films have been bonded together but prior to bonding film 29 to film 28. In this manner, the perforations 40 will be vertically aligned through both of films 26 and 28 as shown. As illustrated in FIG. 7, this may be accomplished by first passing films 26 and 28 through nip rolls 71 to fully or partially bond the films together, e.g., with final bonding occurring at nip rolls 70. The bonded films are then passed through a perforation device 73 to be fully perforated before film 29 is bonded to film 28 at nip rolls 70.

Perforation device 73 may form perforations 40 by any suitable means, such as mechanically, chemically, and/or electrically. Non-limiting examples of such devices include those which perforate with laser energy, electrostatic discharge, ultrasonic waves, flame discharge, needles or other sharp objects, and combinations thereof.

Perforations 40 preferably extend completely through films 26 and 28 to form one or more passageways therethrough. As shown in FIG. 6, when film 28 is delaminated, each of the perforations is separated into two portions along delamination plane 34. One portion extends through layer 50 of delaminatable film 28 and is removed from package 10 along with gas-impermeable film 29 when the gas-impermeable portion 36 is peeled from the package. The other portion of each of the perforations 40 extends through layer 52 of film 28 and also through film 26, and therefore remains with package 10 after laminate 24 has been delaminated.

Any desired number of perforations may be included and the perforations may have any desired size to achieve a desired rate of re-bloom in a packaged meat product after peelable delamination of the gas-impermeable portion of the laminate. For example, the perforations may range in size from 5 to 2000 microns in diameter.

As noted above, an advantage of the present invention is that a label or printed image 44 can be inserted between films 26 and 28 prior to the formation of laminate 24 as shown in FIGS. 5 and 6. Depending upon the particular application, it may be desired that the perforations do not pass through the image 44 as shown in FIGS. 5 and 6. Alternatively, the perforations may pass through the image 44 as shown in FIGS. 2 and 4, e.g., where the size of the perforations does not detrimentally affect the appearance of the image.

A preferred process for inserting a printed image or label between films 26 and 28 is illustrated schematically in FIG. 7, wherein gas-permeable film 26 passes through printing or labeling station 74 prior to being bonded to film 28. At station 74, a printed image and/or label is applied to surface 62 of film 26. Alternatively or in addition, a reverse-printed image and/or label can be applied to surface 60 of film 28 at printing or labeling station 76. In either case, the printed image and/or label is trapped between films 26 and 28 at interface 42 of the resultant laminate 24. More specifically, the printed image or label is trapped between layer 52 of film 28 and the gas-permeable film 26 so that it remains with the laminate/lid 24 after the gas-impermeable portion 36 has been peelably removed at retail. In this manner, the printed image or label, which is applied during production of the laminate and not at retail, remains with the package on which the laminate is lidded after the gas-impermeable portion of the laminate has been removed. Thus, product information and other important indicia can now be applied to the lid of a case-ready package at a central processing/packaging facility, and will remain on the package lid after removal of the gas-impermeable portion so that the information is visible to the consumer.

EXAMPLE

A package was made as shown in FIG. 2, except without perforations 40, as follows. A gas-permeable film 26 with a printed image 44 thereon was placed on the flange 22 of a support member 12, with the printed image facing upwards. A delaminatable film 28 was then placed on top of film 26 so that the printed image 44 was trapped between the two films. Both films were large enough in area to completely cover the support member with extra film extending beyond the flange periphery. The delaminatable and gas-permeable films were then heat-welded to one another at interface 42 with a continuous heat-weld that extended around and above the flange of the support member. Simultaneously, the gas-permeable film was continuously heat-welded to the flange of the support member so that films 26 and 28 formed a sublaminate that was lidded to the support member. In addition, the films were trimmed to be substantially co-extensive with the periphery of the support member flange as shown in FIG. 2.

The cutting and heat-welding steps were accomplished with a Ross 3180 tray lidding machine. The machine had a heat-welding bar of a size and shape corresponding to that of the support member flange. The heat-welding bar applied heat (270° F.) and pressure (80 psi) to the delaminatable and gas-permeable films for 1.2 seconds to simultaneously effect both heat-welds, which were vertically aligned with one another.

A gas-impermeable film 29 was then heat-welded to the delaminatable film around the peripheral flange of the support member in the same manner, except that the heat-welding bar was heated to a temperature of 290° F.

The resultant laminate 24 thus formed a gas-impermeable lid for the support member to complete the package. The lid was then peelably delaminated within the delaminatable film, leaving behind a portion of the delaminatable film and gas-permeable film welded to the support member, with the printed image trapped between the two films as shown in FIG. 4.

The support member 12 was an oriented and thermoformed polystyrene foam tray including a cavity and a peripheral flange, and further included a sealant film bonded to the upper surface of the cavity and flange to facilitate sealing of the lid to the support member and to render the support member gas-impermeable. The sealant film had the following structure:

LLDPE/EVA/TIE/EVOH/TIE/EVA/SBC where:
"LLDPE" is a layer comprising DOWLEX 2244A (TM) heterogeneous ethylene/octene copolymer having a melt index of 3.3 and a density of 0.916 g/cc; obtained from The Dow Chemical Company, of Midland, Mich.;

"EVA" is a layer comprising ELVAX 3165 (™) ethylene/vinyl acetate copolymer having 18 percent by weight of vinyl acetate, a melt index of 0.7 and a density of 0.94 g/cc; obtained from E. I. Dupont de Nemours, of Wilmington, Del. (both "EVA" layers in the above film structure are the same);

"TIE" is a layer comprising TYMOR 1203 (™) anhydride-grafted linear low density polyethylene having a melt index of 1.6 and a density of 0.910 g/cc; obtained from Morton International of Chicago, Ill. (both "TIE" layers in the above film structure are the same);

"EVOH" is a layer comprising LC-H101BD (™) ethylene/vinyl alcohol copolymer having 38 mole percent of ethylene, a melt index of 1.5 and a melt point of 175° C.; obtained from EVAL Co. of America, of Lisle, Ill.; and "SBC" is a layer comprising KK36 (™) styrene/butadiene copolymer having 75 percent by weight of styrene, a melt index of 8.0 (Condition G of ASTM D-1238) and a density of 1.01 g/cc, obtained from Phillips 66, of Pasadena, Tex.

The "SBC" layer was heat-welded to the polystyrene tray while the LLDPE layer was heat-welded to the gas-permeable film.

The gas-permeable film 26 was coextruded and biaxially oriented, had a thickness of about 0.3 mils, and had the structure:

A/B/A where,
"A" is a blend of 60% ethylene/octene copolymer (Dowlex™ 2037 from Dow; having a density of 0.935 g/cc, a MFI 2.5, and 2.5% octene) and 40% ethylene/vinyl acetate copolymer (PE 1335 from Huntsman; having a density of 0.924 g/cc, a MFI of 2.0, and 3.3% vinyl acetate); and "B" is a blend of 60% ethylene/octene copolymer (Dowlex™ 2045.04 from Dow; having a density of 0.92 g/cc, a MFI 1.0, and 6.5% octene) and 40% ethylene/octene copolymer (Dowlex™ 2037 from Dow; having a density of 0.935 g/cc, a MFI 2.5, and 2.5% octene).

The delaminatable film 28 was coextruded and biaxially oriented, had a thickness of about 1 mil, and had the following multilayer structure:

A/B/C/D/C/B/A where:
"A" is a layer (approximately 0.27 mil) comprising a blend of
  25 wt. % of an ethylene/octene-1 copolymer with a density of 0.935 gm/cc., a melt flow index of 2.5, and an octene-1 comonomer content of 2.5%; available from Dow as Dowlex 2037™, and
  75 wt. % of an ethylene/1-octene copolymer with a density of 0.920 gm/cc, a melt flow index of 1.0, and an octene-1 content of 6.5% by weight; available from Dow as Dowlex™ 2045;

"B" is a layer (approximately 0.09 mil) comprising anhydride-grafted polyolefin in ethylene/butene copolymer (6 wt. % butene); with a melt flow index ranging from 0.9 to 1.5 and a melting point of 127° C.; available from DuPont as Bynel™ CXA 4104;

"C" is a layer (approximately 0.09 mil) comprising a blend of
  80 wt. % nylon 6/66 copolymer having a melting point of 196° C.; available from BASF as Ultramid™ C-35, and
  20 wt. %. nylon 6/12 copolymer having a melting point of 130° C.; available from Emser as Grilon™ CF6S; and "D" is a layer (approximately 0.09 mil) comprising a blend of
  90 wt. % ethylene/vinyl alcohol copolymer containing 44 mole % ethylene and having a melt flow index of 1.6 and a melting point of 165° C.; available from EVAL of America as EVAL™ LC E151A, and
  10 wt. % nylon 6/12 copolymer having a melting point of 130° C.; available from Emser as Grilon™ CF6S.

The delaminatable film delaminated at the C/B inter-layer interface closest to the gas-permeable film and support member so that layers B and A (both layers comprising ethylene copolymers) remained bonded to the gas-permeable film as a two-layer film having the structure B/A (with layer A in direct contact with the gas-permeable film and layer B now defining the exterior surface of the package lid). The rest of the delaminatable film, i.e, the five-layer sub-structure A/B/C/D/C, was peelably removed from the package along with the gas-impermeable film. This demonstrates that the heat-welds and inter-layer bonds formed above and below the lower C/B (polyamide/polyethylene) interface had bond-strengths that were greater than the inter-layer adhesive strength between layers C and B.

The gas-impermeable film 29 had a thickness of about 3 mils and had the following structure:

LLDPE/EVA/EVA/ADH/BARRIER where:

"LLDPE" is a layer comprising DOWLEX 2244A (™) heterogeneous ethylene/octene copolymer having a melt index of 3.3 and a density of 0.916 g/cc; obtained from The Dow Chemical Company;

"EVA" is a layer comprising ethylene/vinyl acetate copolymer having 3.6 percent by weight of vinyl acetate, a melt flow index of 2.0, and a density of 0.92 g/cc; obtained from the Rexene Corporation of Dallas, Tex. under the tradename PE 1375 (both "EVA" layers in the above film structure are the same);

"ADH" is an adhesive layer comprising a blend of methylene bis(phenyl isocyanate), an ethyl ester of acetic acid, and a polyol curing agent; and "BARRIER" is an oxygen barrier material comprising saran-coated (dispersion, one side) polyethylene terephthalate having a thickness of 0.56 mil; obtained from DuPont under the tradename 50M-44 Mylar™.

What is claimed is:

1. A laminate, comprising:
   a. a first, substantially gas-impermeable film;
   b. a second, delaminatable film;
   c. a third, gas-permeable film; and
   d. an image disposed between said second and third films,
wherein, said second film is positioned between said first and third films and said laminate is capable of delaminating within said second film when said laminate is subjected to a delaminating force.

2. The laminate of claim 1, wherein said image is a printed image bonded to at least one of said second and third films.

3. The laminate of claim 1, wherein said second and third films are perforated.

4. The laminate of claim 1, wherein said second film is a multilayer film and comprises two adjacent layers that delaminate from one another when said laminate is subjected to a delaminating force, the adjacent layers being bonded together at an inter-layer bond-strength ranging from about 0.001 to about 2.5 pounds per inch.

5. The laminate of claim 1, wherein said second film comprises at least one layer that cohesively separates when said laminate is subjected to a delaminating force, the cohesively separating layer having an intralayer cohesive-strength ranging from about 0.001 to about 2.5 pounds per inch.

6. The laminate of claim 1, wherein said first film is bonded to said second film and said second film is bonded to said third film.

7. The laminate of claim 6, wherein said first, second, and third films are bonded via reactive surface modification.

8. The laminate of claim 1, wherein said second film is gas-permeable.

9. The laminate of claim 1, wherein said third film is perforated and said second film is not perforated.

10. A package for a product, comprising:
    a. a product support member for supporting a product thereon; and
    b. a laminate bonded to said support member such that the product is enclosed between said support member and said laminate, said laminate comprising:
       1) a first, substantially gas-impermeable film,
       2) a second, delaminatable film,
       3) a third, gas-permeable film, and
       4) an image disposed between said second and third films,
wherein, said second film is positioned between said first and third films and said laminate is capable of delaminating within said second film when said laminate is subjected to a delaminating force.

11. The package of claim 10, wherein said laminate is bonded to said support member at said third film so that, upon delamination of said laminate, said third film and a portion of said second film remain bonded to said support member.

12. The package of claim 10, wherein said image is a printed image bonded to at least one of said second and third films.

13. The package of claim 10, wherein said second and third films are perforated.

14. The package of claim 10, wherein said second film comprises two adjacent layers that delaminate from one another when said laminate is subjected to a delaminating force, the adjacent layers being bonded together at an inter-layer bond-strength ranging from about 0.001 to about 2.5 pounds per inch.

15. The package of claim 10, wherein said second film comprises at least one layer that cohesively separates when said laminate is subjected to a delaminating force, the cohesively separating layer having an intralayer bond-strength ranging from about 0.001 to about 2.5 pounds per inch.

16. The package of claim 10, wherein said first film is bonded to said second film and said second film is bonded to said third film.

17. The package of claim 16, wherein said first, second, and third films are bonded via reactive surface modification.

18. The package of claim 10, wherein said second film is gas-permeable.

19. The package of claim 10, wherein said support member comprises a cavity and a peripheral flange connected to and extending outwardly from said cavity, said third film of said laminate being bonded to said flange via a heat-weld.

20. The package of claim 10, wherein said first and second films are bonded via a first heat-weld and said second and third films are bonded via a second heat-weld.

21. The package of claim 10, wherein said third film is perforated and said second film is not perforated.

* * * * *